Feb. 20, 1951 A. ZOUCKERMANN 2,542,788
ELECTROMAGNETIC BRAKE FOR RAIL VEHICLES
Filed May 29, 1947
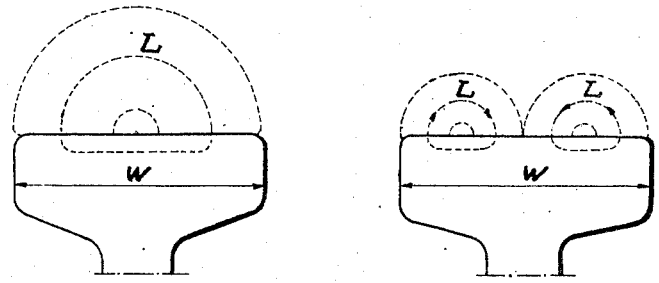
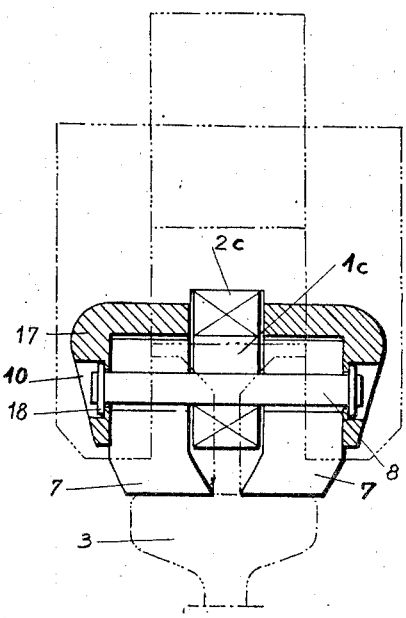
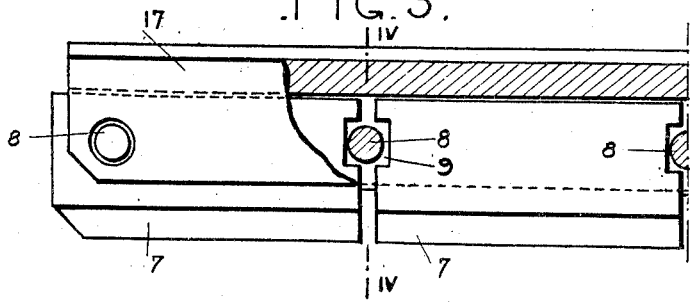
Inventor:
Armand Zouckermann
By: Watson, Cole, Grindle & Watson Patented Feb. 20, 1951

2,542,788

UNITED STATES PATENT OFFICE 2,542,788

ELECTROMAGNETIC BRAKE FOR RAIL VEHICLES

Armand Zouckermann, Paris, France, assignor to Societe Anonyme Freins Jourdain Monneret, Paris, France Application May 29, 1947, Serial No. 751,289
In France December 12, 1946

7 Claims. (Cl. 188—165)

The present invention relates to improvements in electromagnetic track brakes for street and railway cars. These improvements particularly relate to the construction of such brakes.

It is known that with a view to obtain the maximum magnetic stress F from an electromagnet for a minimum weight P, i. e., the greatest ratio F/P, it is necessary to build electromagnets as small as possible. For geometrically similar electromagnets in which the value of the intensity of magnetizing is the same, this ratio $$F/P = K/\sqrt[3]{P}$$

tends towards infinity when the weight P approaches zero.

For electromagnetic track brakes, unfortunately, there is one dimension which cannot be decreased, that is the width of the rail. The only value which can be varied is the length of the magnetic circuit, since the induction B is determined by the quality of the materials used and since the cross-section of the magnetic circuit has a surface equal to the product of the length of the brake shoe by the width of the rail, whose values are also imposed.

Further, for an electromagnetic track brake, the coils must be dimensioned so as to be able to withstand an important heating due to the frequent placing under voltage.

It is just now possible to satisfy to said both conditions by the use, on one hand, of high magnetic permeability metals or alloys, such as pure iron for instance, for decreasing the number of ampere-turns required for the coils and, on the other hand, of insulating materials having a high thermal resistance, such as plastic materials known under the appellation of "silicones," which allow to decrease the cross-section of the wire in the coils without any danger of damaging the insulation.

It is thus possible in an electromagnetic track brake to decrease to a minimum the dimensions of the coil and of the magnetic circuit, as well as the value of the magnetic leakage and of the reluctance of said circuit. The braking effect of such a track brake is at least equal to that given by a similar conventional electromagnetic track brake, the ratio between the magnetic stress and the weight of the brake being increased by proper reduction of said weight.

On the other hand, due to the unevenness of the treads of the rails, the rigid conventional brake heads rebound on the rails and leave from time to time its tread, inducing longitudinal air gaps.

Besides, similar longitudinal air gaps result from the fact that the rails are never perfectly straight and are also liable to be distorted during the running of the railway car, whereby the contact surfaces between rigid brake heads and rails are limited to a small number of points.

Now, the smallest air gap during the braking operation reduces substantially the magnetic stress and consequently the braking effect. Besides, the air gap variations generate in the rail electromotive forces which are sometime troublesome (D. C. Automatic Block System).

For decreasing the influence of longitudinal air gaps, it has been already proposed to divide each electromagnetic brake head in successive elementary electromagnetic brake elements each of them comprising an individual core on which is wound an individual coil, said core carrying side elements on which are fixed shoe elements, the terminal elementary brake elements being fixedly secured on a guiding frame while the intermediate brake elements are freely mounted on said frame, so that they may freely move in the vertical direction and freely pivot about their edges of attack. But, on the one hand, the weight of said movable elementary brake elements is sufficiently important to induce rebounds and, on the second hand, the relative rigidity of the terminal elementary brake elements generates longitudinal air gaps when said latter brake elements contact a part of the rail projecting above the tread of said rail.

With a view to overcome all said aforesaid drawbacks, the main object of the invention is to provide in an electromagnetic track brake of the kind wherein the coils are insulated by materials having a high thermal resistance and the magnetic parts are made of high magnetic permeability metals or alloys, successive elementary side elements, acting simultaneously as brake shoes, freely movable with respect to a common core by vertical translation and pivoting in a vertical plane tangent to said core, said core forming one of the guiding surfaces for each of said side elements, whereby said side elements contact the rail whatever the irregularities of its tread.

Further, due to the use of materials having a high thermal resistance and of materials having a high magnetic permeability, the dimensions of said side elements and their weight are reduced to a minimum, whereby no rebound is obtained.

Besides, a very important simplification in manufacture is thus obtained, particularly owing to the smaller number of parts and to the reduction of the dimensions of said parts, requiring less machine work. Also, the low cost of an elementary side element of small dimensions makes it possible to contemplate, after wear, its entire replacement without an excessive expenditure, whence the uselessness of removable shoe elements.

Another object of the invention is to provide, in an electromagnetic track brake of the character described, a common longitudinal support, preferably of non-magnetic material, which embraces the side elements for forming the second guiding surface for each of said side elements.

A further object of the invention is to provide electromagnetic track brake of the character described wherein, due to the low height of the side elements, the total length of each brake head is increased by the best use of the maximum space available between two successive axles of the railway or streetcar equipped with said brake.

The description which follows together with the appended schematic drawings given by way of non-limitative examples, will clearly show how the invention may be performed practically.

In the drawings:

Figures 1 and 2 show diagrammatically the theoretical minimum length for two different magnetic circuits.

Figure 3 shows, in elevation, a brake head with divided articulated side elements acting as shoes.

Figure 4 is a corresponding transverse section, indicating, by way of comparison, the size of an equivalent conventional brake head.

Figure 1 shows schematically the theoretical minimum length L obtainable for the magnetic circuit of a bi-polar electromagnetic brake head applied over the whole width W of the rail. This minimum is of the order of .8 W for a coil of almost zero volume, while in a brake head of conventional construction said length L is of the order of 6 to 7 W.

Figure 2 is relative to the case of a tri-polar electromagnetic brake head; the minimum length L, here, is of the order of .4 W, and the size of the brake head in height is decreased by about one-half, as well as the weight.

As shown in Figures 3 and 4, each brake head comprises a succession of independent elementary brake elements formed by elementary pairs of brake shoes 7 acting simultaneously as side pieces for a common core 1c made of material having a high magnetic permeability, each pair or each shoe being freely mounted on pins 8 secured on said common core 1c. On said common core is wound a common coil 2c insulated by a material having a high thermal resistance. Each of the intermediate brake shoes 7 is formed on each of its vertical edges 11 with a cavity 9 registering with vertical clearance the corresponding pin 8. Each of the end brake shoes 7 is formed on its vertical edge facing an intermediate brake shoe with a cavity similar to said cavity 9. Further, said end brake shoes are provided with holes engaging the terminal pins 8. The distance existing between two successive elementary brake shoes is greater than the diameter of the corresponding pin so that an important play exists between the cavities 9 of said brake shoes and said pin.

The pins 8 are preferably of magnetic material and serve at the same time as supports for the common core 1c; they are held in position on a U-shaped support 17 by stop elements such as circlips 18 located in housings 10 worked on the outer side of the flanges of said support.

Support 17 is not part of the magnetic circuit and consequently may be made of a light alloy, for instance.

When the coil supported by the common core is energized, the resulting magnetic pull brings each of said elementary brake shoes or each pair of brake shoes on the rail. Each elementary brake shoe is submitted to a horizontal force in a direction opposite to that of the displacement of the railway car, said force being at all times normal to the point of contact of the pin 8 with the cavity 9.

Further, each elementary brake shoe being movable in a vertical direction and pivotable in a vertical plane around adjacent pins, said elementary brake shoe may contact the rail whatever the irregularities in the tread of the latter, whereby, for each brake head, the longitudinal air gaps are suppressed.

Due to the relative lightness of said elementary brake shoes and to their mobility, the rebounds of said brake shoes on the uneven rail are avoided, thus suppressing the generation of longitudinal air gaps by rebound and their variations.

In Figure 4, the profile of a brake head having the same stress but of the conventional construction has been shown in broken lines.

The brake heads as illustrated in Figures 3 and 4 are particularly convenient for the construction of tetra-polar electromagnetic braking devices due to the fact that, the side members being cut and the general support being of non-magnetic material, the leakage which would occur in the middle part of the usual rigid side members is eliminated.

What I claim is:

1. A brake head for an electromagnetic track brake comprising, in combination, a common core, a common coil wound on said common core, a plurality of successive pairs of opposite movable side members, acting simultaneously as brake shoes and guided on their inner lateral surfaces by said core, means for allowing a vertical movement and a pivotal movement of each of said side members in a vertical plane with respect to said core, and means for supporting said side members.

2. A brake head for an electromagnetic track brake comprising, in combination, a common core, a common coil wound on said common core, a plurality of successive pairs of opposite movable side members, acting simultaneously as brake shoes and guided on their inner lateral surfaces by said core, the intermediate brake shoes being formed on their vertical edges with vertically elongated recesses, the terminal brake shoes being formed on their vertical edges facing an intermediate brake shoe with similar elongated recesses and on their parts opposite to said recesses with holes, and a plurality of pins secured on said core and engaging said holes and the pairs of facing recesses with a substantial amount of play.

3. A brake head for an electromagnetic track brake comprising, in combination, a common core, a common coil wound on said common core, a plurality of successive pairs of opposite movable side members, acting simultaneously as brake shoes and guided on their inner lateral surfaces by said core, a common U-shaped support bridging said pairs of opposite side members and associated with said core, the inner surfaces of the lateral flanges of said support guiding the outer surfaces of said opposite side members and means for allowing a vertical movement and a pivotal movement of each of said side members in a vertical plane with respect to said core.

4. A brake head for an electromagnetic track brake comprising, in combination, a common core, a common coil wound on said common core, a plurality of successive pairs of opposite movable side members, acting simultaneously as brake shoes and guided on their inner lateral surfaces by said core, the intermediate brake shoes being formed on their vertical edges with vertically elongated recesses, the terminal brake shoes being formed on their vertical edges facing an intermediate brake shoe with similar elongated recesses and on their parts opposite to said recesses with holes, a common U-shaped support bridging said pairs of opposite side members and associated with said core, the inner surfaces of the lateral flanges of said support guiding the outer surfaces of said opposite side members, said core being formed with transverse bores opposite to the holes formed in the terminal brake shoes and to the intervals provided between the adjacent recesses of the successive pairs of brake shoes, said support being formed opposite to said first set of bores with a second set of bores opening in housings machined on the outer side of the flanges thereof, pins of magnetic material fixedly mounted in the bores of said core, crossing said intervals with vertical and longitudinal plays and projecting within the corresponding housings of said support, and means for securing said projections within said housings.

5. A brake head for an electromagnetic track brake comprising, in combination, a common core made of material having a high magnetic permeability, a common coil wound on said common core and the wire of which is coated by an insulating material having a high thermal resistance, a plurality of successive pairs of opposite movable side members, made of material having a high magnetic permeability, acting simultaneously as brake shoes and guided on their inner surfaces by said core, means for allowing a vertical movement and a pivotal movement of each of said side members in a vertical plane with respect to said core, and means for supporting said side members.

6. A brake head for an electromagnetic track brake comprising, in combination, a common core made of material having a high magnetic permeability, a common coil wound on said common core and the wire of which is coated by an insulating material having a high thermal resistance, a plurality of successive pairs of opposite movable side members, made of material having a high magnetic permeability, acting simultaneously as brake shoes and guided on their inner surfaces by said core, a common U-shaped support bridging said pairs of opposite side members and associated with said core, the inner surfaces of the lateral flanges of said support guiding the outer surfaces of said opposite side members, and means for securing said side members on said core and on said support and simultaneously allowing relative pivotal and translational movements between said side members, on one hand, and said core and support, on the other hand.

7. A brake head for an electromagnetic track brake comprising, in combination, a common core made of material having a high magnetic permeability, a common coil wound on said common core and the wire of which is coated by an insulating material having a high thermal resistance, a plurality of successive pairs of opposite movable side members, made of material having a high magnetic permeability, acting simultaneously as brake shoes and guided on their inner surfaces by said core, the intermediate brake shoes being formed on their vertical edges with vertically elongated recesses, the terminal brake shoes being formed on their vertical edges facing an intermediate brake shoe with similar elongated recesses and on their parts opposite to said recesses with holes, a common U-shaped support of non-magnetic material bridging said pairs of opposite side members and associated with said core, the inner surfaces of the flanges of said support guiding the outer surfaces of said opposite side members, said core being formed with transverse bores opposite to the holes formed in the terminal brake shoes and to the intervals provided between the adjacent recesses of the successive pairs of brake shoes, said support being formed opposite to said first set of bores with a second set of bores opening in housings machined on the outer side of the flanges thereof, pins of magnetic material fixedly mounted in the bores of said core, crossing said intervals with vertical and longitudinal plays and projecting within the corresponding housings of said support, and means for securing said projections within said housings.

ARMAND ZOUCKERMANN.

REFERENCES CITED

The following references are of record in the file of this patent:

UNITED STATES PATENTS

| Number | Name | Date |
| --- | --- | --- |
| 2,153,383 | Mathes | Apr. 4, 1939 |
| 2,207,151 | Hirshfeld | July 9, 1940 |
| 2,255,798 | Mason | Sept. 15, 1941 |
| 2,464,568 | Flynn et al. | Mar. 15, 1949 |

FOREIGN PATENTS

| Number | Country | Date |
| --- | --- | --- |
| 441,676 | Great Britain | Jan. 23, 1936 |
| 585,172 | Germany | Dec. 23, 1933 |
| 702,166 | Germany | Jan. 31, 1941 |
| 827,409 | France | Apr. 26, 1938 |